United States Patent [19]
Gromes

[11] Patent Number: 5,562,043
[45] Date of Patent: Oct. 8, 1996

[54] RAIL AND CARRIAGE SYSTEM WITH MAGNETICALLY ADHERED PLASTIC TRACK

[75] Inventor: Terry D. Gromes, Navarre, Ohio

[73] Assignee: Valley Systems, Inc., Canal Fulton, Ohio

[21] Appl. No.: 341,391

[22] Filed: Nov. 17, 1994

[51] Int. Cl.$^6$ .............................. B61C 11/04; B61C 9/38
[52] U.S. Cl. .................... 105/29.1; 105/96; 105/127; 105/133; 105/144; 104/106; 104/119
[58] Field of Search .......................... 105/29.1, 96, 127, 105/133, 141, 144; 104/106, 107, 109, 118, 119

[56] References Cited

U.S. PATENT DOCUMENTS

| | | | |
|---|---|---|---|
| 3,226,027 | 12/1965 | Cable et al. | 105/29.1 |
| 3,575,364 | 4/1971 | Frederick | 105/29.1 |
| 3,656,364 | 4/1972 | Cable et al. | 74/422 |
| 4,241,664 | 12/1980 | Cable | 105/29.1 |
| 4,456,228 | 6/1984 | Cable et al. | 266/70 |
| 4,570,542 | 2/1986 | Cable et al. | 105/29.1 |
| 4,703,698 | 11/1987 | Kazlauskas | 105/29.1 |
| 5,223,962 | 6/1994 | Jassby et al. | 105/29.1 |

Primary Examiner—S. Joseph Morano
Attorney, Agent, or Firm—Sand & Sebolt

[57] ABSTRACT

A system for moving a work element along a work surface for performing work thereon includes an elongated track of flexible plastic material formed with gear teeth along one edge thereof. A carriage having a drive motor and a drive wheel driven thereby, is moved along the track by the drive wheel engaging the gear teeth. The drive wheel is connected to the drive motor by an eccentric cam mechanism. The work element is carried by the carriage and preferably is a high-pressure fluid cutting device. The track is formed of a flexible plastic material such as a linear high density polyethylene, enabling it to bend and conform to the work surface, and has a second elongated strip of plastic material movably secured to the track and extending longitudinally therealong. A series of magnets are mounted on the track for adhering the track to the work surface. The magnets are attached to the track by fasteners extending through slotted openings in the second strip of the track when conforming to the work surface. The carriage includes a spring-biased mechanism which biases the drive wheel through the eccentric cam mechanism into driving engagement with the track teeth which enables the drive wheel to compensate for any irregularities in the track teeth as it moves along the track.

17 Claims, 8 Drawing Sheets

RAIL AND CARRIAGE SYSTEM WITH MAGNETICALLY ADHERED PLASTIC TRACK

BACKGROUND OF THE INVENTION

1. Technical Field

The invention relates to a magnetically held track and to a carriage movable along the track which carries a work element for performing work on a work surface to which the track is magnetically adhered. More particulary, the invention relates to such a rail and carriage system in which the rail is formed of a high-strength plastic material, enabling it to bend to tighter radii and conform to the curvature of the work surface, and to a carriage having a resiliently mounted drive wheel enabling it to compensate for irregularities in the track teeth along which the carriage is driven by an internal motor.

2. Background Information

Magnetically held tracks having gear teeth formed thereon or attached thereto, have been used for numerous years for moving a carriage containing a work tool, such as a cutting or welding torch, for performing work on a workpiece on which the track is adhered.

Examples of some of these prior art rail and carriage systems are shown in U.S. Pat. Nos. 3,226,027, 3,656,364, 4,241,664, 4,456,228 and 4,570,542. These prior art rails are all formed of a metallic material, such as aluminum, enabling it to readily bend in order to conform to the curvature of a workpiece, such as a large diameter metal tank. The carriage usually contains a motor and a drive wheel having gear teeth driven by the motor, which teeth drivingly engage and mesh with gear teeth formed on the metal track. The track teeth are either formed integrally in the metal strip of the track or are formed as a separate component and mounted thereon.

However, several problems are present in such prior art tracks. The metal which forms the track becomes wrinkled after several uses and does not return to its original shape. Furthermore, the metal is affected by the vast differences in temperature to which it is exposed during use and storage. Even minor deformations in the track caused by use or the environment will affect the driving relationship with the carriage, often resulting in the carriage binding on the track as it attempts to move therealong by the driving engagement between the drive wheel of the carriage and the gear teeth on the track. Furthermore, these prior art metal tracks are relatively limited in the size of the radius to which they may be bent due to the thickness in the metal required to provide a sufficiently rigid track to retain the accuracy of the meshing engagement of the gear teeth mounted thereon and the drive wheel.

Another problem that exists with current carriages used for such tracks is that the drive wheel of the carriage is normally mounted in a fixed position on the carriage and rotated by an internal drive motor. Even slight irregularities in the teeth on the track, either caused by manufacturing tolerances, the collection of dirt and debris therein during use, and/or flexing of the track due to its bending and/or distortion caused by heat and cold, can affect the driving relationship between the gear teeth of the drive wheel of the carriage and the gear teeth of the track, resulting in binding of the carriage thereon.

Therefore, there is a need for an improved rail and carriage system which supports a workpiece on the carriage, which rail has increased flexibility and longer life, and which is unaffected by changes in temperature on the rail, and is unaffected by irregularities in the track teeth or the collection of debris therein.

SUMMARY OF THE INVENTION

Objectives of the invention include providing an improved rail and carriage system in which the rail is formed of a high-strength plastic material, such as a high-density polyethylene, which is unaffected by changes in temperature.

Another objective of the invention is to provide such a system in which the gear teeth are formed in the edge of the rail instead of in the center thereof, as in prior art rail systems.

Still another objective of the invention is to provide such a system in which the permanent magnets which attach the rail to a workpiece are movably mounted with respect to the rail to permit limited movement between the magnets and rail to compensate for bending of the rail when conforming to the contour of a workpiece.

Another objective of the invention is to provide a carriage which is compatible for use with a circular metal track, enabling it to be used for cutting extreme radii and circular configurations in a work surface.

A further objective of the invention is to provide such a system in which the track is formed of two pieces movably joined together to provide greater flexibility to the track than if formed by a single thickness of material without sacrificing track strength.

These objectives and advantages are obtained by the improved rail and carriage system of the invention, the general nature of which may be stated as a system for movably supporting a work element closely adjacent a work surface, and wherein said system comprises an elongated track formed of a flexible plastic material and having spaced upper and lower surfaces and side edges, with said surfaces each having a width substantially greater than the thickness of said side edges; magnetic means mounted on the track for holding said track on a work surface; gear teeth formed in and extending along one edge of the track; a carriage adapted to travel along the track; and a work holder mounted on the carriage for holding a work element adapted to perform work on the work surface as the carriage moves along said track.

BRIEF DESCRIPTION OF THE DRAWINGS

A preferred embodiment of the invention, illustrative of the best mode in which applicant has contemplated applying the principle, is set forth in the following description and is shown in the drawings and is particularly and distinctly pointed out and set forth in the appended claims.

FIG. 9A is an enlarged fragmentary sectional view taken on line 9A—9A, FIG. 7;

FIG. 9B is a fragmentary sectional view taken on line 9B—9B, FIG. 9;

Similar numerals refer to similar parts throughout the drawings.

DESCRIPTION OF THE PREFERRED EMBODIMENT

Figure 1:
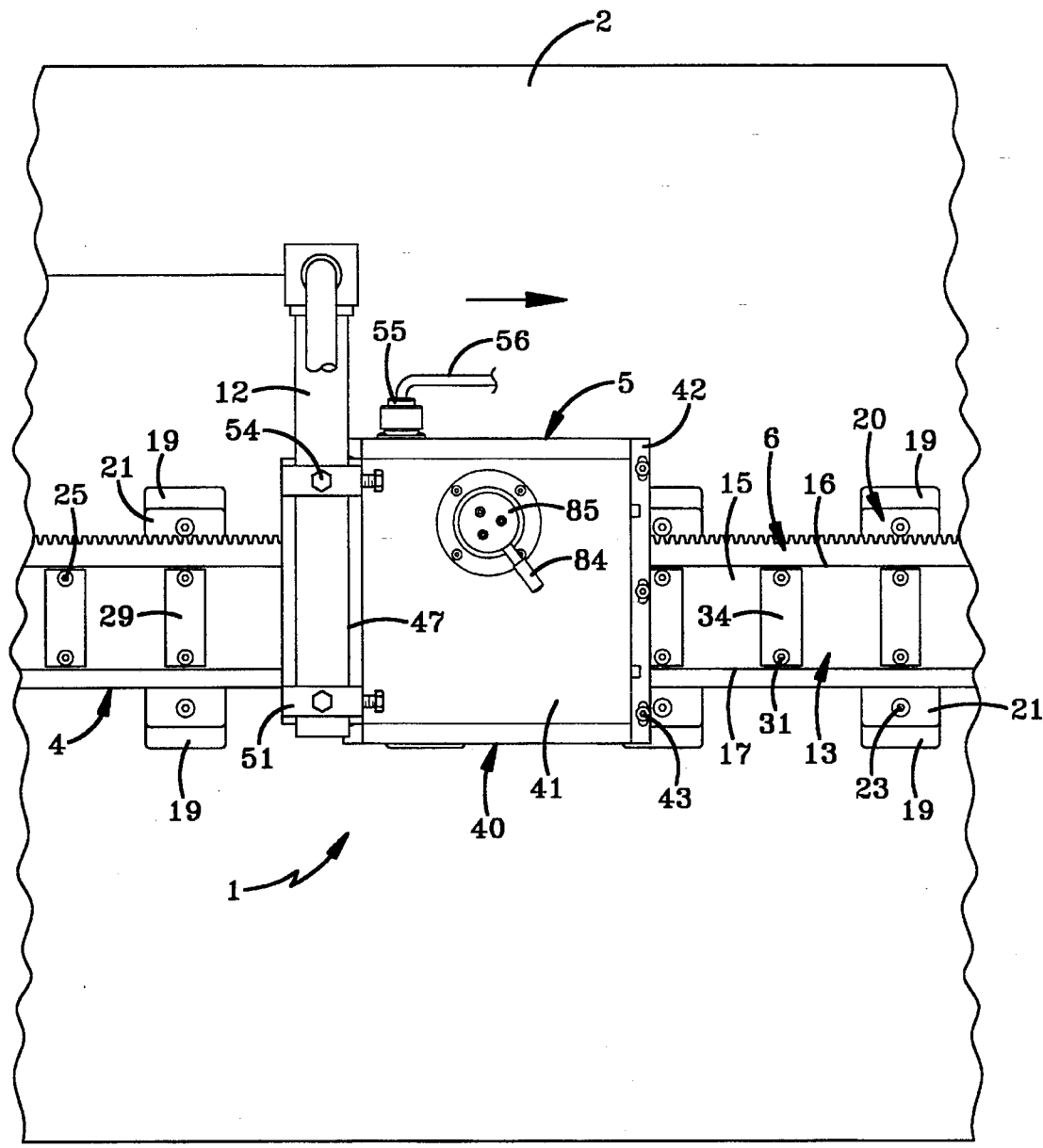
FIG. 1 is a fragmentary elevational view showing the improved rail and carriage system mounted on the side of a workpiece.

The improved rail and carriage system of the invention is indicated generally at 1, and is shown in FIG. 1 mounted on the side of a workpiece, such as a cylindrical storage tank 2 of the type used for storage of gas, oil, water or various fluids. If desired, workpiece 2 could be other surfaces than that of a tank, and could be a flat vertical or horizontal surface and need not be curved. However, one of the advantages achieved by the improved rail and carriage system of the present invention is its ability to be mounted on and used with workpieces having curved surfaces.

System 1 includes two main elements, namely, a rail, indicated generally at 4, and a carriage, indicated generally at 5. Rail 4 includes a main elongated track 6 having first and second surfaces 7 and 8, and spaced parallel edges 9 and 10. Surfaces 7 and 8 will have a substantially greater width than the thickness of the strip or width of the edges. In the preferred embodiment, track 6 will have a width of approximately four inches and a thickness of approximately three-eighths of an inch. However, these dimensions can vary without affecting the concept of the invention.

In accordance with one of the main features of the invention, track 6 is formed of a plastic material, preferably a high-density polyethylene. In the preferred embodiment, the polyethylene is an ultra-high molecular-weight polyethylene having a density in g/cm$^3$ of approximately 0.93 and a shore D hardness of approximately 65, and has a maximum tensile strength of approximately 6000 psi and a tensile impact in ft-lbs/in$^2$ of approximately 1050. This provides a track which is relatively unaffected by the extreme changes in temperature to which the track is subjected during use and storage, yet provides a sufficiently strong and rigid track which is able to support and move carriage 5 therealong, including a work element 12 (FIG. 3) supported by the carriage. The work element moves along the track with the carriage and performs a function on the workpiece or storage tank 2.

Rail 4 further includes an attachment strip, indicated generally at 13, which is mounted on and extends along track 6, as shown particularly in FIGS. 3–6. Attachment strip 13 preferably is formed of the same high-strength plastic material as is track 6, and has the approximate same thickness, but preferably is of a narrower width or thickness. In the preferred embodiment, strip 13 has a width of approximately two and five-eighths inches. Attachment strip 13 has a generally flat planar configuration as does track 6, and first and second flat planar surfaces 14 and 15, and edges 16 and 17.

Figure 6:
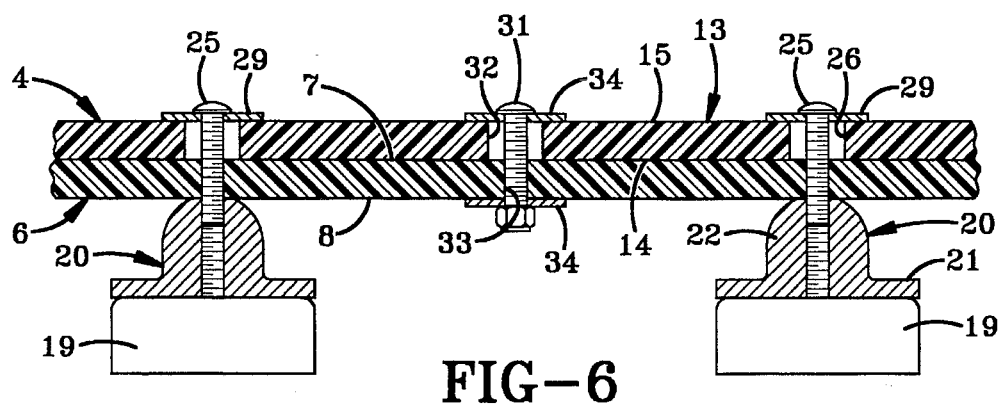
FIG. 6 is a fragmentary sectional view taken on line 6—6, FIG. 5.

A plurality of permanent magnets 19 are mounted on track 6 by mounting brackets 20, and are spaced longitudinally along the second surface 8 of track 6 for magnetically adhering rail 4 on a metallic workpiece 2. Mounting brackets 20 and magnets 19 may have a variety of configurations, and are shown in the drawings as having a flat base or plate portion 21 and a semi-cylindrical portion 22 (FIG. 6). Magnets 19 preferably are attached by bolts 23 to flat base portions 21 of brackets 20.

In accordance with another of the features of the invention, each mounting bracket 20 is attached to rail 4 by a pair of bolts 25 which extend through elongated slots 26 formed in attachment strip 13 and through aligned holes 27 formed in track 6, and then into threaded holes 28 formed in bracket 20. The passage of bolts 25 through elongated slots 26 enables attachment strip 13 and track 6 to move with respect to each other and with respect to magnet mounting bolts 25 to permit the bending of rail 4, as shown particularly in FIGS. 6 and 6A. Preferably, an elongated rectangular strip of metal 29 functions as a washer between the heads of bolts 25 and surface 15 of attachment strip 13.

Figure 6A:
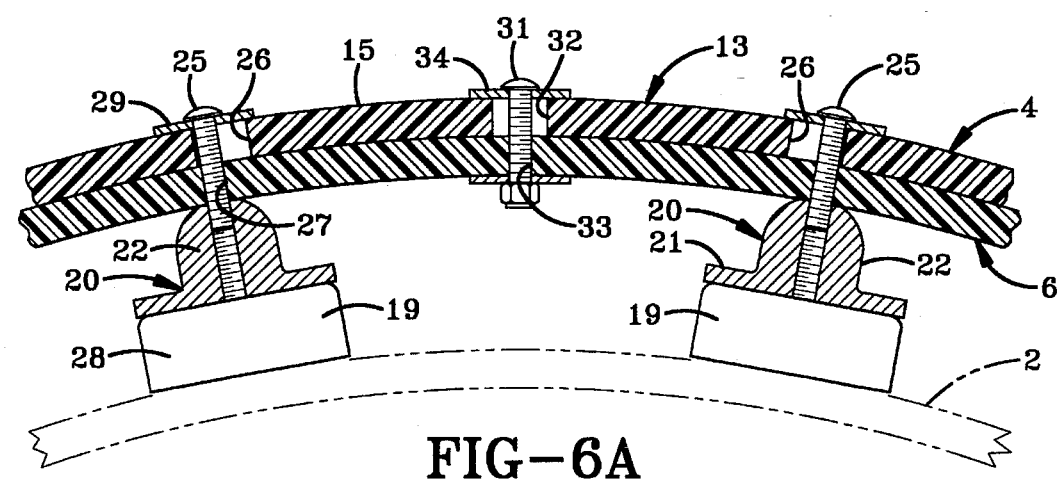
FIG. 6A is a sectional view similar to FIG. 6 with the rail shown in a curved condition.

Track 6 and attachment strip 13 are further secured together, preferably midway between each spaced pair of magnets 19 by a pair of bolts 31 which extend through elongated slots 32 formed in attachment strip 13 similar to slots 26, and then through aligned holes 33 formed in track 6, in combination with a pair of rectangular-shaped washers 34. Slots 32 again assist in providing a sliding movement between attachment strip 13 and track 6 to permit rail 4 to be bent, as shown in FIGS. 6A.

In further accordance with the invention, a series of gear teeth 36 are formed in edge 9 of track 6 for mating engagement with complimentary-shaped gear teeth 37 formed in a drive wheel 38 of carriage 5. Carriage 5 consists of a housing, indicated generally at 40, and includes a cover plate 41 having an open bottom which is closed by a motor mounting plate 42, which is secured thereto by a plurality of bolts (not shown). A carriage mounting base plate 44, which is complementary in shape and size to plate 42, is secured to plate 42 by a plurality of bolts 43. Four track-mounting brackets 45 are secured to plate 44 and extend outwardly therefrom, each being provided with a pair of spaced wheels 46 between which extend edges 9 and 10 of track 6 for movably mounting the carriage on track 6 (FIGS. 2, 3 and 4).

Figure 2:
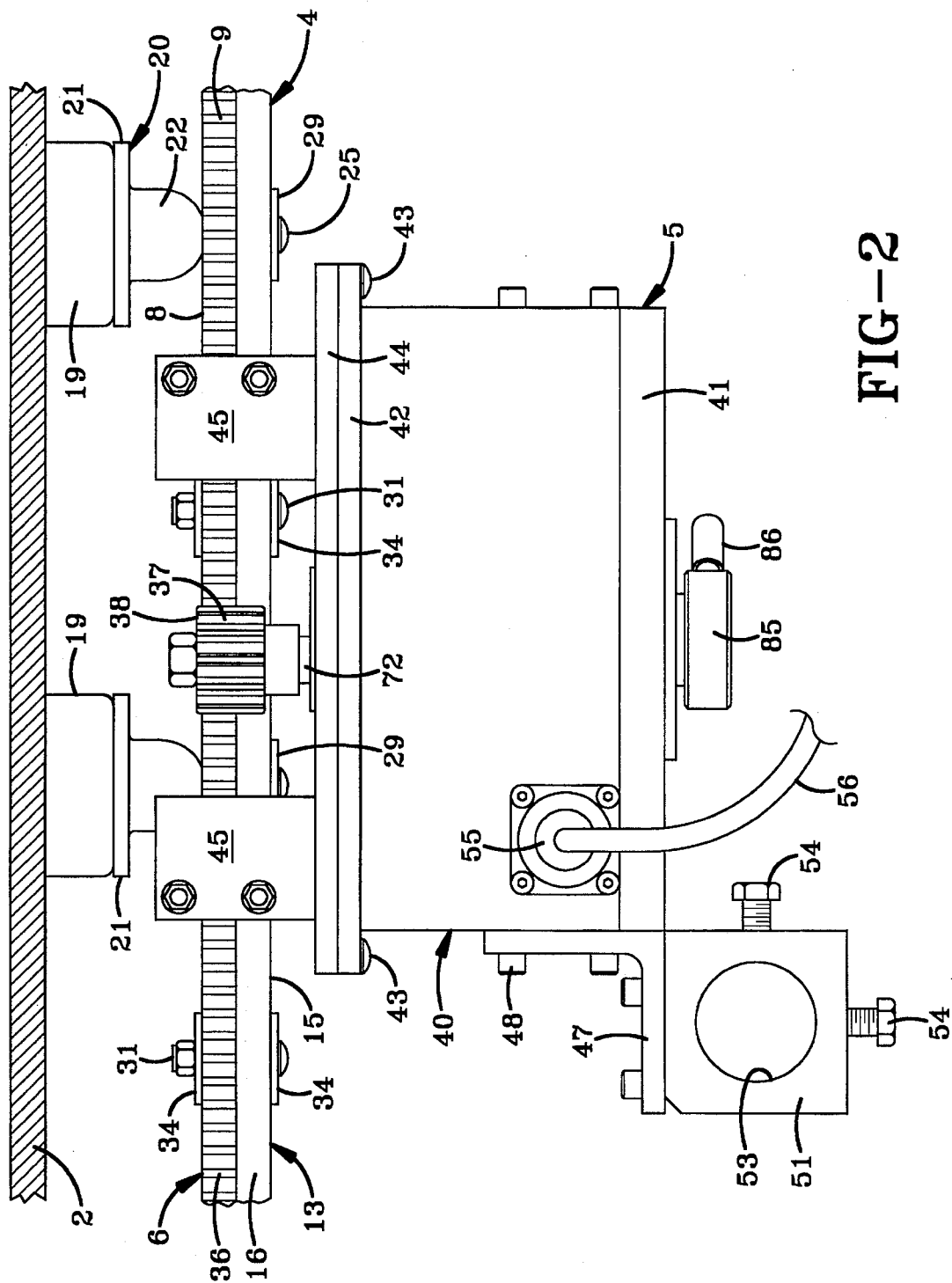
FIG. 2 is a top view of the rail and carriage system as shown in FIG. 1, with the workpiece being shown in section.
Figure 3:
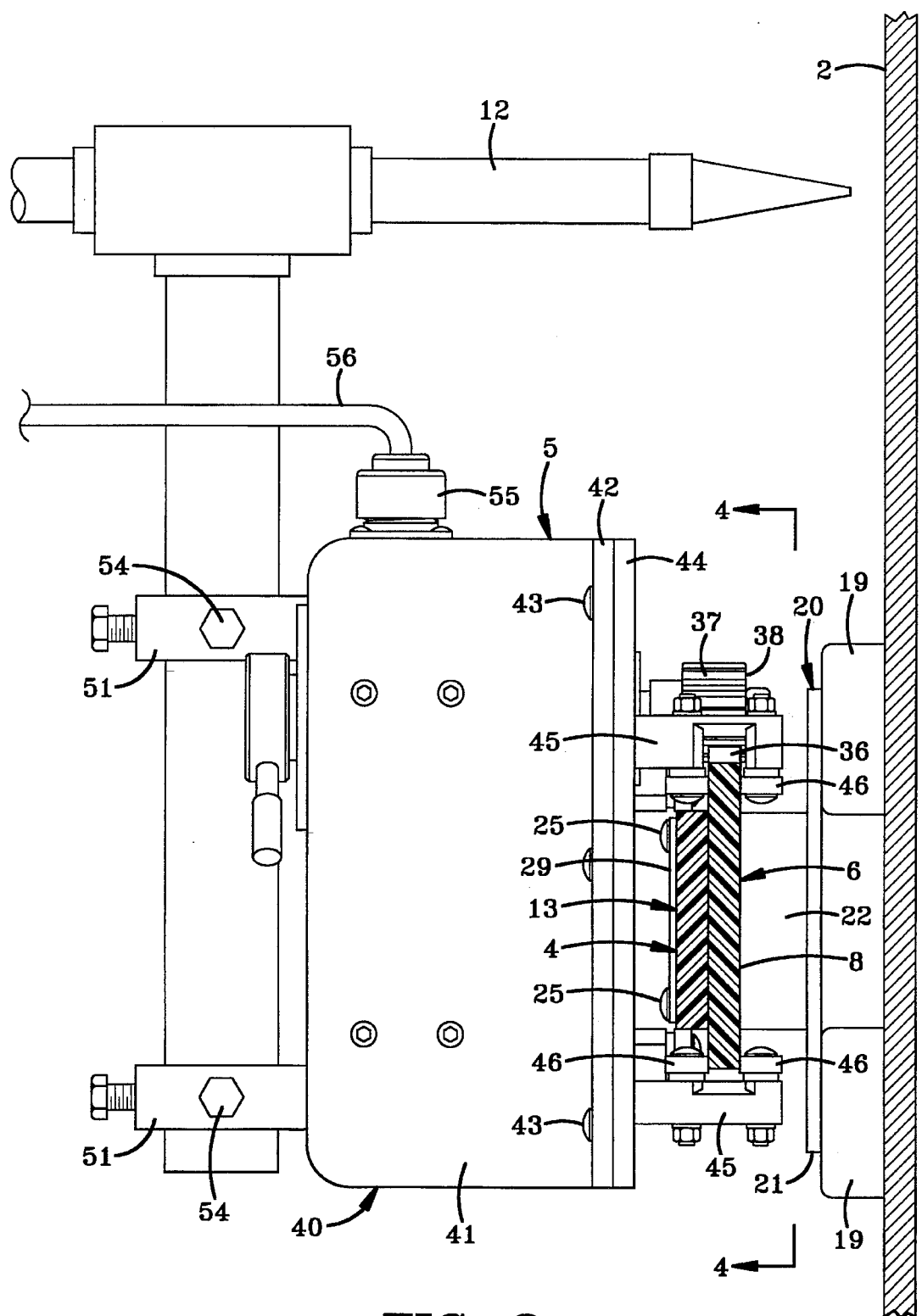
FIG. 3 is a side elevational view of the rail and carriage system of FIG. 1 with portions of the track and workpiece being shown in section.
Figure 4:
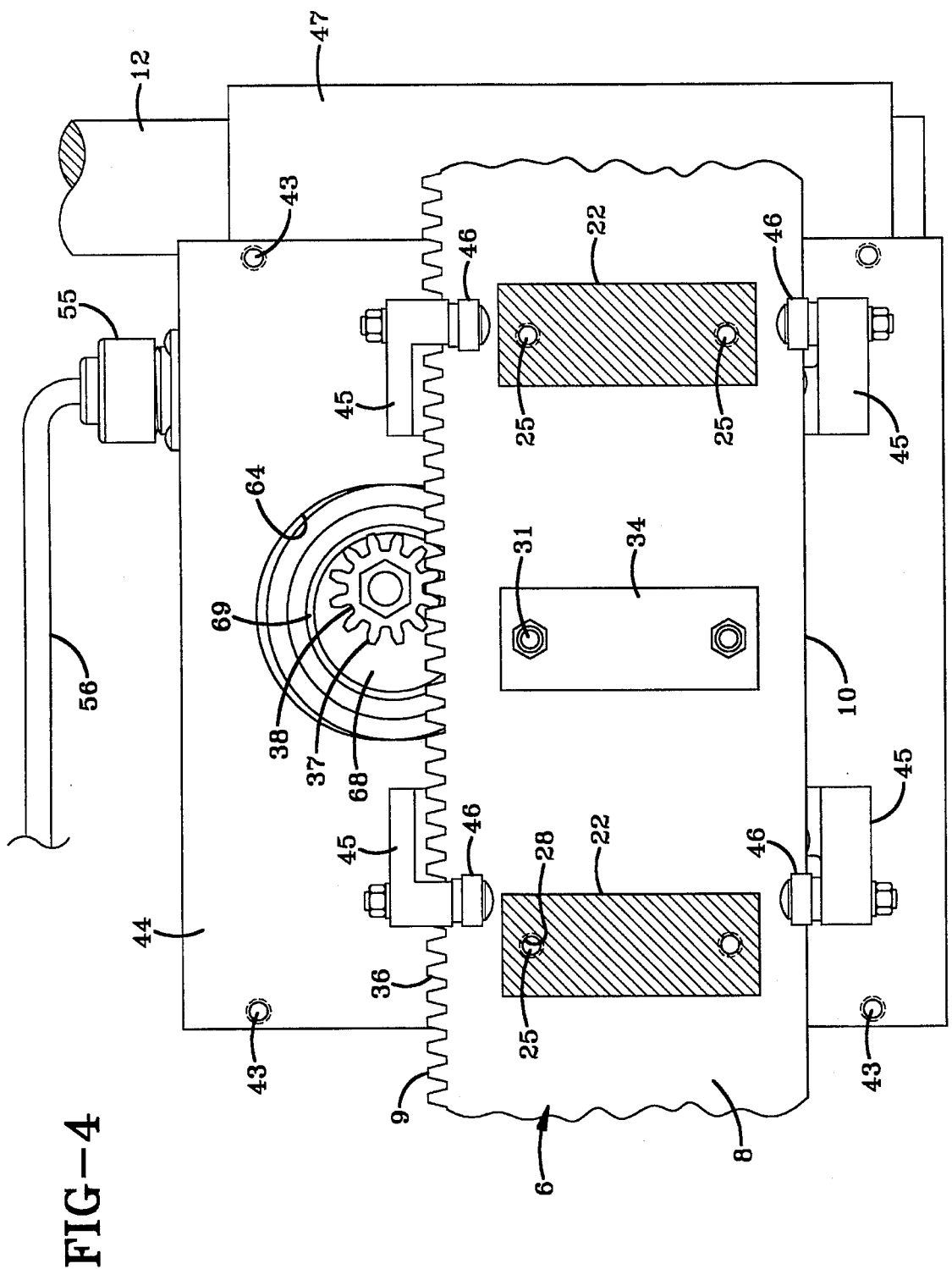
FIG. 4 is a sectional elevational view taken on line 4—4, FIG. 3.
Figure 5:
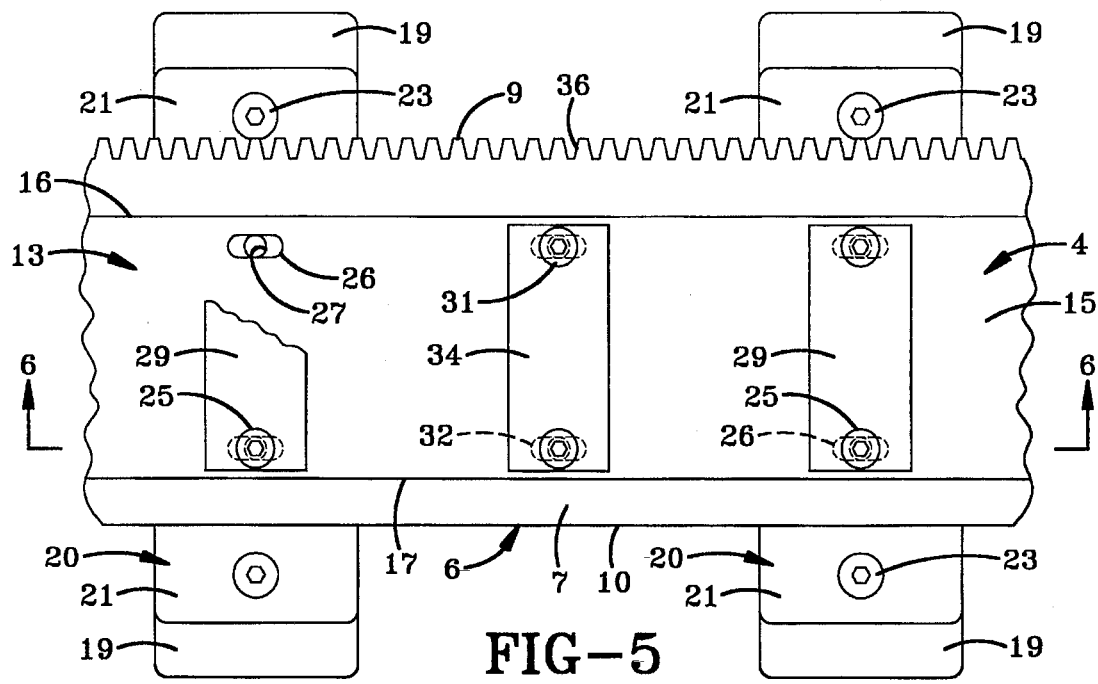
FIG. 5 is a fragmentary plan view of the rail with portions broken away.

A pair of work element mounting brackets 51 extend outwardly from an L-shaped mounting plate 47 which is secured by bolts 48 to a side wall of housing cover plate 41, in an opposite direction from brackets 45 (FIGS. 1, 2 and 3). Brackets 51 are preferably formed with a circular opening 53 in which is slidably mounted the work element 12, which is secured therein by a plurality of set bolts 54. In the preferred embodiment, work element 12 will be an ultra high-pressure fluid cutting device, although it could be a cutting torch, welding tip, or the like, without affecting the concept of the invention. An electrical terminal 55 is mounted on a side wall of cover plate 41, and has an outwardly extending power cord 56 for connection to a remote electrical supply for supplying power to a drive motor 58 mounted within the hollow interior of housing 40

Figure 7:
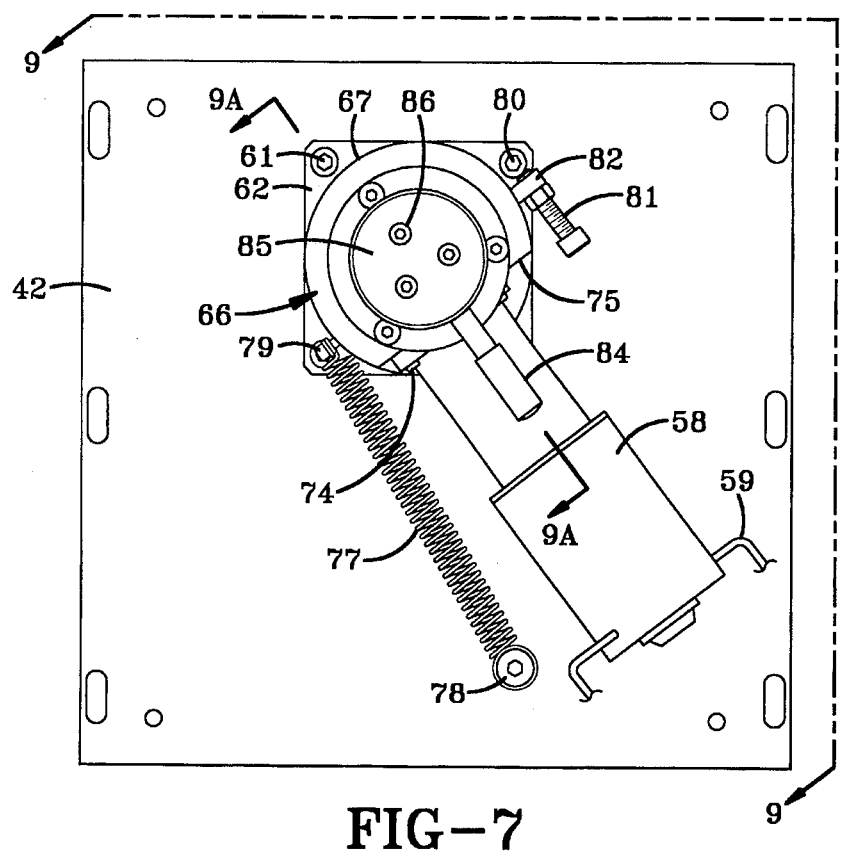
FIG. 7 is a view of the carriage with the housing and bottom carriage mounting plate removed therefrom.
Figure 8:
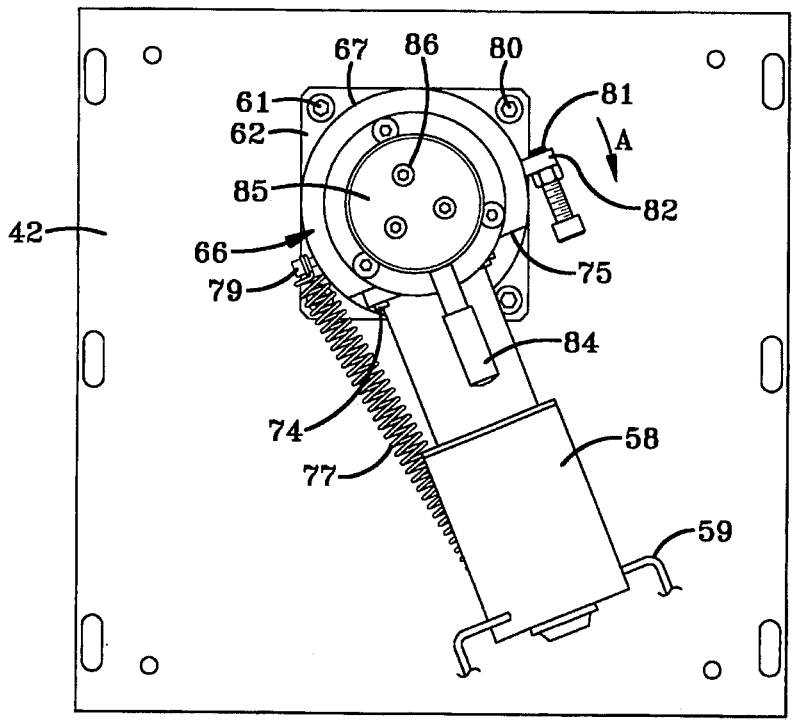
FIG. 8 is a view similar to FIG. 7 with the motor and drive gear being rotated against the biasing action of the spring.
Figure 9:
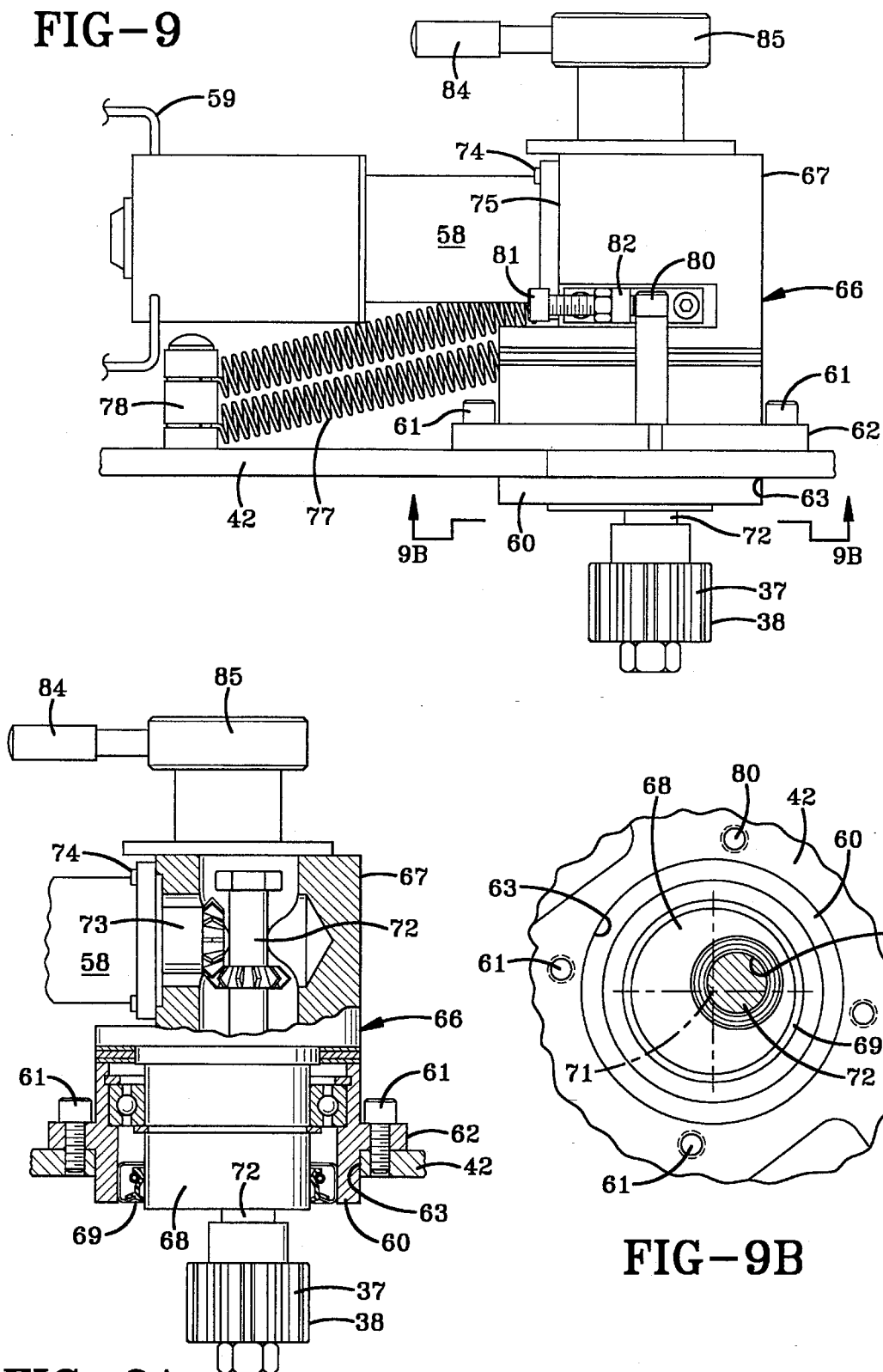
FIG. 9 is an end view looking in the direction of arrows 9—9, FIG. 7.
Figure 10:
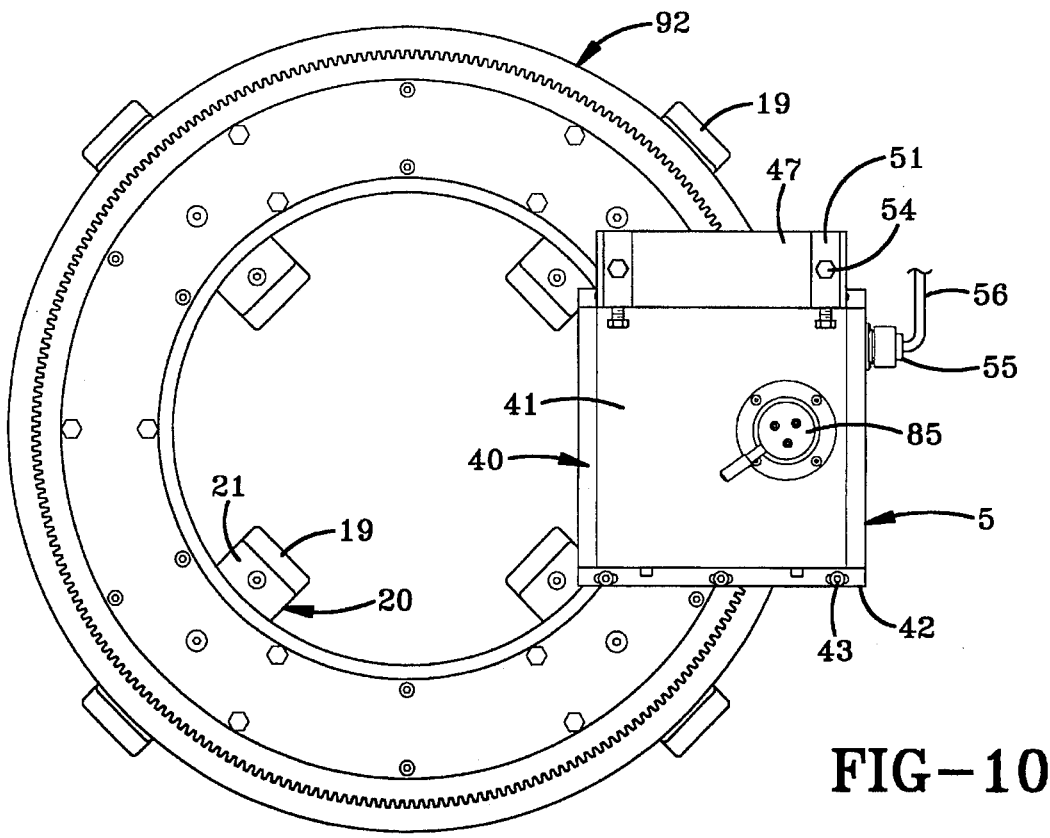
FIG. 10 is a top plan view of the carriage mounted on a circular rail.

(FIGS. 7–9). Motor 58 will be connected to electrical terminal 55 by a pair of wires 59, and in the preferred embodiment, will be 12 V DC motor.

Referring particularly to FIGS. 4, 7, 8, 9, 9A and 9B, motor 58 is movably mounted on motor mounting plate 42 by an annular mounting collar 60 which has an intermediate flange 62 that is secured by bolts 61 on plate 42. Collar 60 is mounted in aligned circular openings 63 and 64 formed in plates 42 and 44, respectively. A motor mounting block, indicated generally at 66, includes an upper motor mounting portion 67 and a lower cylindrical portion 68 which is rotatably mounted within the hollow interior of mounting collar 60 by a bearing sealing ring 69.

In accordance with one of the main features of the invention, a shaft mounting hole 70 extends through lower cylindrical portion 68 of motor mounting block 66, and is offset from the longitudinal center 71 thereof, as shown particularly in FIG. 9B. A motor transmission shaft 72 is mounted within hole 70, and is connected at its outer end to drive wheel 38 and at its inner end to output shaft 73 of motor 58. Motor 58 is mounted in a horizontal position by a plurality of motor mounting bolts 74 on a flat portion 75 formed in upper motor mounting portion 67 of mounting block 66.

A pair of biasing springs 77 are secured at one end to a post 78, which is mounted on and extends from motor mounting plate 42, and at their opposite end, to a stud 79, which is mounted on and extends outwardly from motor mounting block 66. A stop post 80 is mounted on and extends outwardly from mounting flange 62 of collar 60, and engages an adjustable stop screw 81 which is movably adjustably mounted within a threaded opening of a tab 82, which is mounted on and extends outwardly from the upper portion 67 of motor mounting block 66. Springs 77 rotatably bias motor mounting block 66 and attached motor 58 within annular mounting collar 66, so that motor drive wheel 38 is in driving engagement with gear teeth 36 of track 6.

FIG. 7 shows the normal operating position of motor mounting block 66 and motor 58 when biased to its maximum position provided by the adjustment setting of stop screw 81, in which position gear teeth 37 of drive wheel 38 are engaged with rail teeth 36, as shown in FIGS. 2, 3 and 4. An annular cap 85 is mounted on the top end of motor mounting block 66 by screws 86 and has a lever 84 extending outwardly therefrom for manual engagement by an operator of the rail and carriage system. Manual rotation of lever 84 and cap 85 will rotate motor mounting block 66 and motor 58 in the direction of arrow A (FIG. 8), which will disengage motor drive wheel 38 from track teeth 36, enabling carriage 5 to be moved freely along rail 4 until reaching a desired position. Pressure then is released from lever 84, permitting springs 77 to rotate the drive motor and connected components, including motor mounting block 66 and drive wheel 38 back to the position of FIGS. 2, 4 and 7, wherein the motor drive teeth reengage track gear teeth 36.

The eccentric resilient mounting of the motor drive shaft and attached drive wheel 38 with respect to the carriage will ensure a constant tension between drive wheel 38 and gear teeth 36 of track 6, and enables continued movement on the carriage should debris or irregularities occur along gear teeth 36. This will permit gear teeth 36 and 37 to compensate for such irregularities or debris collecting in the valleys of either sets of gear teeth. Again, springs 77 will continually bias gear teeth 37 into driving engagement with rail gear teeth 36 to provide the desired driving tension therebetween, which again, is regulated by movement of adjustable stop screw 81 and unaffected by minor irregularities or debris, etc.

Figure 11:
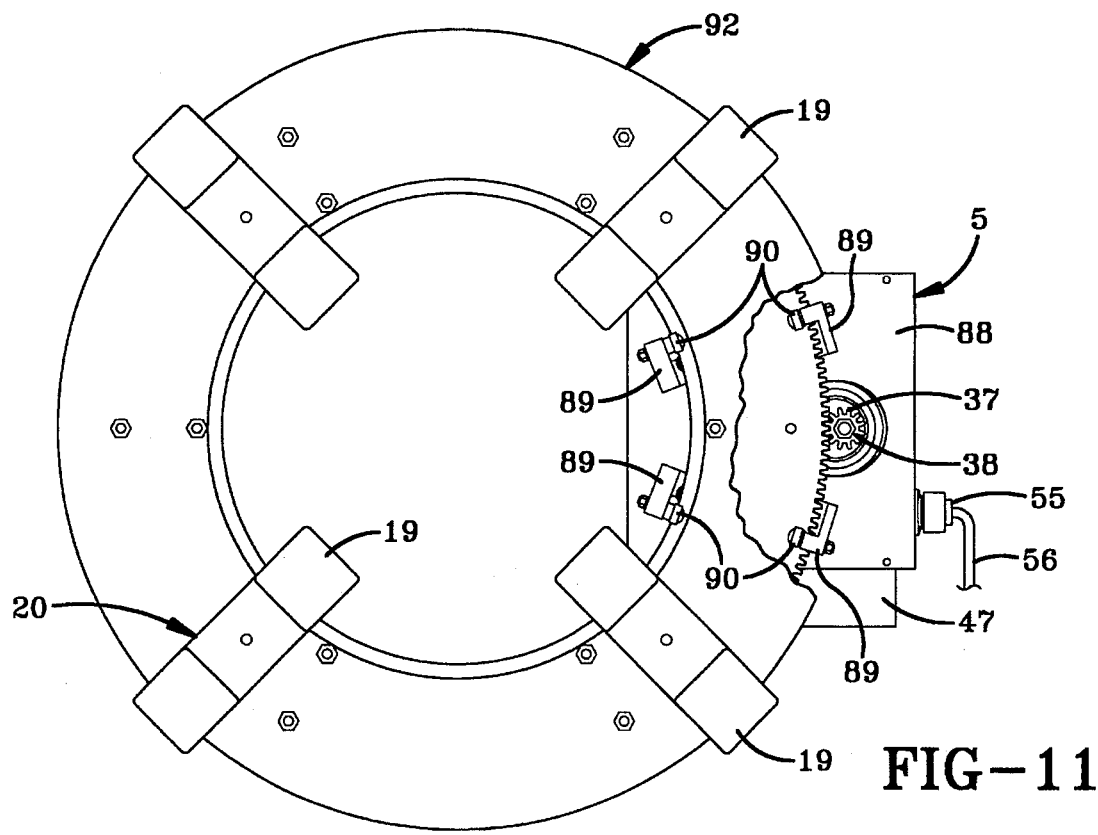
FIG. 11 is a bottom plan view of the carriage and rail system shown in FIG. 10 with portions broken away.

In accordance with another feature of the invention, base plate 44 can be easily removed from motor mounting plate 42 by removal of bolts 43. This enables a modified base plate 88 to be secured to plate 42 (FIG. 11) which contains four rail mounting brackets 89 having spaced-apart wheels 90 mounted thereon, enabling carriage 5 to be mounted on a circular track, indicated generally at 92, for cutting circular openings in workpiece 2. This enables various base plates having various rail mounting brackets and wheel configurations to be readily removed and attached to motor mounting plate 42 by bolts 43 without disassembling carriage housing 40 or disturbing any of the internal components thereof. Circular track 92 may be metal, plastic or other types of materials and is also mounted on a metallic workpiece by magnets 19, as is rail 4 described above.

Accordingly, the improved rail and carriage system of the present invention provides a rail which is formed of a high strength plastic material, which is more easily bent to conform to the curvature of a workpiece, such as a metal storage tank, than prior metal tracks, and has sufficient memory so that it will return to its previous uncurved shape without wrinkling or distorting the rail, as occurs with prior art rails formed of metal.

Also, the formation of gear teeth 36 in the edge of track 6 provides a better driving connection with motor drive wheel 39 than if formed in the center of the track, as in prior art devices. Carriage 5, and in particular, the eccentric cam mounting of the motor drive wheel 38 thereon, and its spring-bias connection to its mounting plate, ensures a constant driving force between gear teeth 37 of motor drive wheel 38 and gear teeth 36 of track 6, while compensating for manufacturing tolerances in the various components and any accumulation of dirt or debris in the gear teeth of either the track or drive wheel.

Another advantage is that carriage base plate 44 is easily removed from the bottom of the carriage housing and replaced with a base plate having modified rail mounting wheels thereon, enabling the same carriage to be used with various types of rails, without disturbing the interior or other components of the carriage and drive motor and drive wheel thereof.

Accordingly, the rail and carriage system is simplified, provides effective, safe, inexpensive, and efficient devices which achieve all the enumerated objectives, provide for eliminating difficulties encountered with prior devices, and solve problems and obtain new results in the art.

In the foregoing description, certain terms have been used for brevity, clearness and understanding; but no unnecessary limitations are to be implied therefrom beyond the requirement of the prior art, because such terms are used for descriptive purposes and are intended to be broadly construed.

Moreover, the description and illustration of the invention is by way of example, and the scope of the invention is not limited to the exact details shown or described.

Having now described the features, discoveries and principles of the invention, the manner in which the improved rail and carriage system is constructed and used, the characteristics of the construction, and the advantageous, new and useful results obtained; the new and useful structures, devices, elements, arrangements, parts and combinations, are set forth in the appended claims.

I claim:

1. A system for movably supporting a work element closely adjacent a work surface, said system comprising:

an elongated track formed of a flexible plastic material and having spaced first and second surfaces and side edges, with said surfaces each having a width substantially greater than the thickness of said side edges;

magnetic means mounted on the track for holding said track on the work surface, said magnetic means being a series of permanent magnets spaced longitudinally along the track adjacent the second surface of said track;

an elongated attachment strip of flexible plastic material mounted on and extending along the first surface of the track;

slotted openings formed in at least one of the elongated attachment strip and track adjacent the magnets;

fastener means extending through said slotted openings for mounting the magnets on the track;

gear teeth formed in and extending along one edge of the track;

a carriage adapted to travel along the track; and a work holder mounted on the carriage for holding a work element adapted to perform work on the work surface as the carriage moves along said track.

2. The system defined in claim 1 in which the track is formed of a high density polyethylene.

3. The system defined in claim 2 in which the polyethylene is an ultra high molecular weight polyethylene having a density in g/cm³ of approximately 0.93 and a shore D hardness of approximately 65.

4. The system defined in claim 3 in which the polyethylene has a maximum tensile strength of approximately 6000 psi and a tensile impact in ft-lbs/in² of approximately 1050.

5. The system defined in claim 2 in which the track has a width of approximately four inches and a thickness of approximately three-eighth of an inch.

6. The system defined in claim 1 in which each of the fastener means includes at least a pair of bolts and a pair of backup strips of material extending transversely on the attachment strip and second surface of the track, with said bolts passing through aligned holes formed in said backup strips.

7. The system defined in claim 1 in which the carriage includes a drive motor and a drive wheel driven by said motor; in which the drive wheel includes a plurality of drive teeth; and in which said drive teeth engage the gear teeth of the track to move said carriage along said track.

8. The system defined in claim 7 in which the carriage further includes a spring-biased camming mechanism which biases the drive wheel of the drive motor toward driving engagement with the gear teeth of the track.

9. The system defined in claim 8 in which the carriage further includes a housing having a motor mounting plate; and in which the camming mechanism includes a motor mounting block rotationally mounted on said motor mounting plate.

10. The system defined in claim 9 in which the drive motor is mounted on the motor mounting block; and in which the camming mechanism includes spring means which extend between said mounting block and mounting plate for biasing the motor drive wheel toward the track.

11. The system defined in claim 10 in which the carriage includes adjustable stop means for limiting biasing movement of the motor drive wheel toward the track.

12. The system defined in claim 11 in which a control device is mounted on the motor mounting block for manually rotating said mounting block against the biasing of the spring means to disengage the motor drive wheel from the track.

13. The system defined in claim 9 in which a base plate is removably mounted on the motor mounting plate; and in which a plurality of carriage support wheels are mounted on the base plate for movably mounting the carriage on the track.

14. The system defined in claim 9 in which the drive motor includes a drive shaft eccentrically mounted within the motor mounting block.

15. A system for movably supporting a work element closely adjacent a work surface, said system comprising:

an elongated track formed of a flexible plastic material and having spaced first and second surfaces and side edges, with said surfaces each having a width substantially greater than the thickness of said side edges;

magnetic means mounted on the track for holding said track on the work surface;

gear teeth formed in and extending along one edge of the track;

a carriage adapted to travel along the track, said carriage including a housing having a motor mounting plate and a motor mounting block rotatably mounted on said plate, a drive motor having a drive shaft eccentrically mounted within the motor mounting block, and a drive wheel driven by said motor, said drive wheel including a plurality of drive teeth which engage the gear teeth of the track to move said carriage along said track, and a spring-biased camming mechanism which biases the drive wheel toward driving engagement with the gear teeth of the track; and a work holder mounted on the carriage for holding a work element adapted to perform work on the work surface as the carriage moves along said track.

16. A carriage for supporting a work element for movement along a track mounted on a work surface, said carriage including:

a housing having a motor mounting plate;

a motor mounted within the housing and having a drive shaft and a drive wheel driven by said drive shaft, said drive wheel having a plurality of drive teeth adapted to drivingly engage the track for moving the carriage therealong; and a spring-biased camming mechanism for biasing the drive wheel toward driving engagement with the track when the carriage is mounted on said track, said camming mechanism including a motor mounting block rotationally mounted on the motor mounting plate, with the motor drive shaft being eccentrically mounted within said motor mounting block.

17. The carriage defined in claim 16 in which a collar is mounted on the housing; and in which the motor is rotatably mounted on the collar.

* * * * *